E. HUNDEN.
BEET HARVESTING MACHINE.
APPLICATION FILED MAY 14, 1915.

1,203,345.

Patented Oct. 31, 1916.
4 SHEETS—SHEET 3.

Fig. 3.

Witnesses
*[signatures]*

Inventor
Edwin Hunden.
By *[signature]*
Attorney

E. HUNDEN.
BEET HARVESTING MACHINE.
APPLICATION FILED MAY 14, 1915.
1,203,345.
Patented Oct. 31, 1916.
4 SHEETS—SHEET 4.
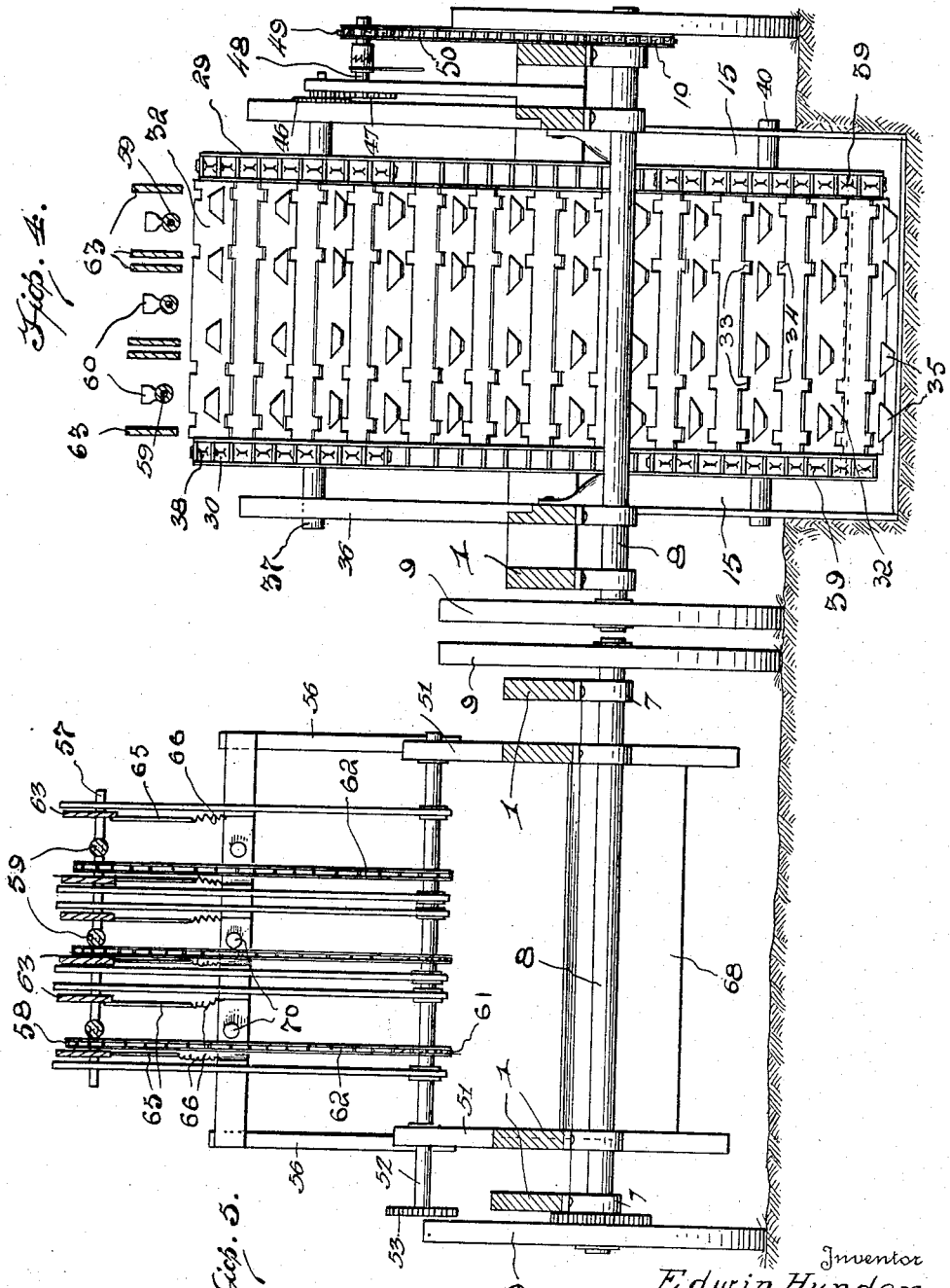

ately at

UNITED STATES PATENT OFFICE.

EDWIN HUNDEN, OF CANON CITY, COLORADO.

BEET-HARVESTING MACHINE.

1,203,345.  Specification of Letters Patent.  Patented Oct. 31, 1916.

Application filed May 14, 1915. Serial No. 28,139.

*To all whom it may concern:*

Be it known that I, EDWIN HUNDEN, a citizen of the United States, residing at Canon City, in the county of Fremont and State of Colorado, have invented certain new and useful Improvements in Beet-Harvesting Machines; and I do hereby declare the following to be a full, clear, and exact description of the invention, such as will enable others skilled in the art to which it appertains to make and use the same.

This invention is an improved beet harvesting machine for digging the beets and also for cutting off the tops of beets.

One object of my invention is to effect improvements in the construction of the beet digging plow.

Another object is to provide improved means for adjusting the beet digging plow vertically to cause it to operate at any desired depth in the ground.

Another object is to provide an improved mechanism for taking the beets from the plow as they are dug up by the latter and carrying the beets to a topping mechanism which automatically cuts off the beet tops.

Another object is to effect improvements in the construction of the beet topping mechanism.

With the above and other objects in view the invention consists in the construction, combination and arrangement of devices hereinafter described and claimed.

Figure 1:
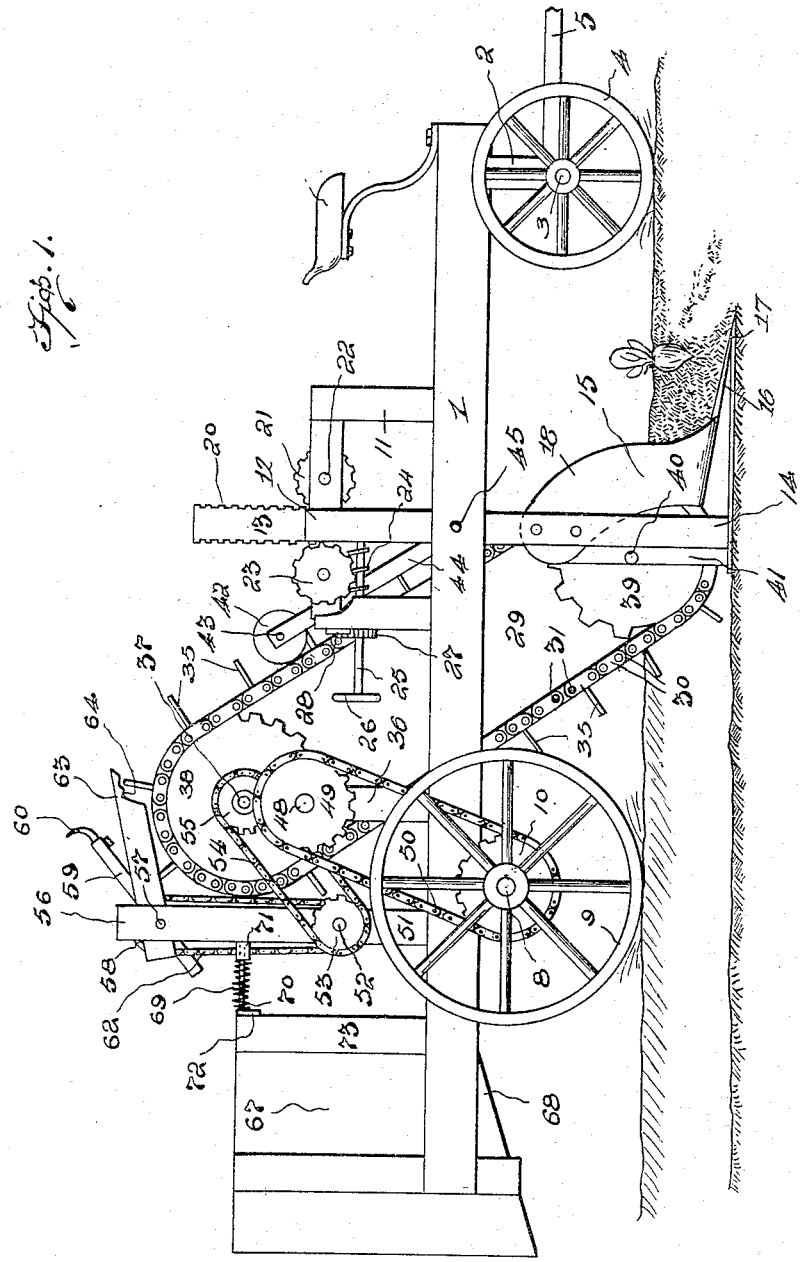
Figure 2:
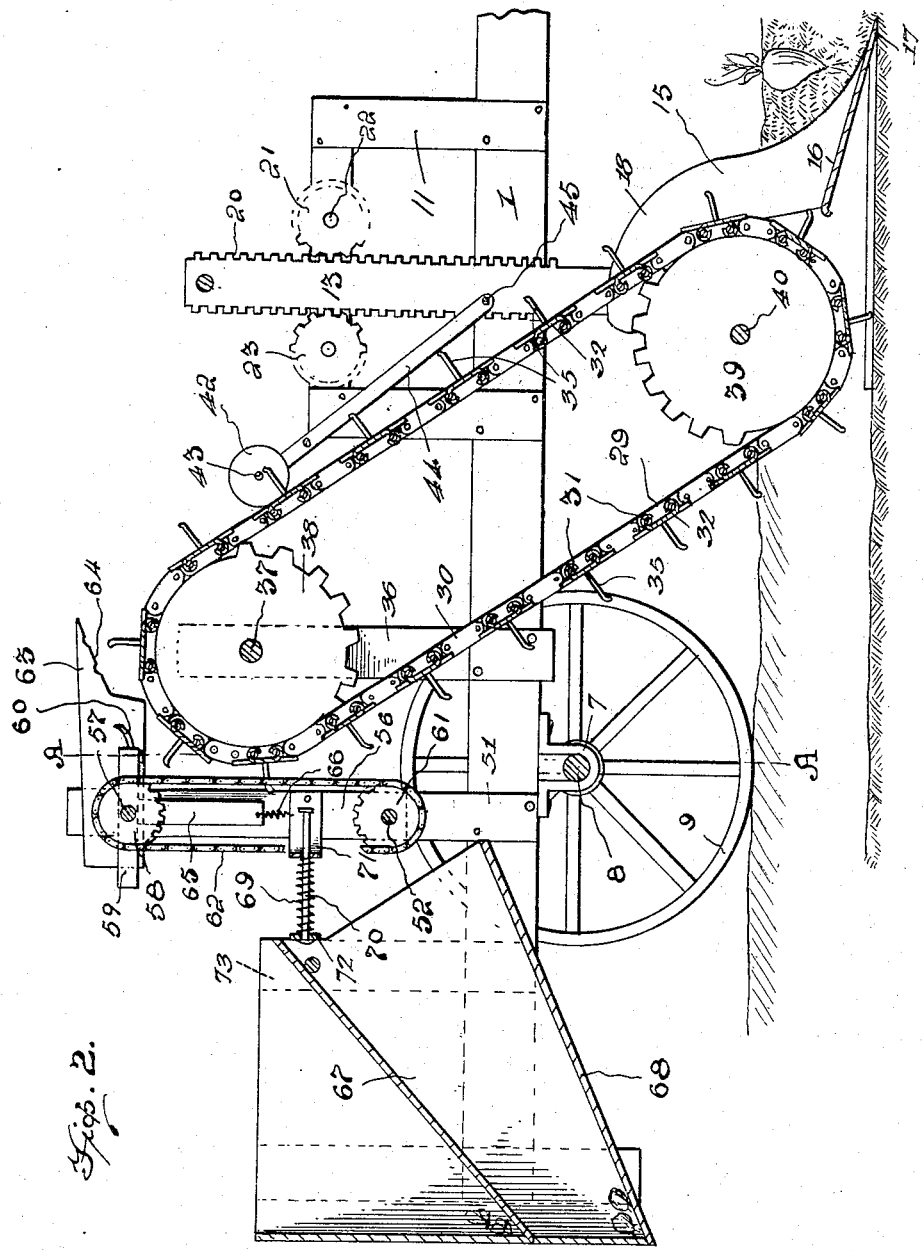

In the accompanying drawings, Figure 1 is a side elevation of a beet harvesting and topping machine constructed in accordance with my invention. Fig. 2 is a vertical longitudinal sectional view of the main portion of the same, on a larger scale. Fig. 3 is a plan of the same. Fig. 4 is a vertical transverse sectional view of the same on the plane indicated by the line A—A of Fig. 2 and looking forwardly. Fig. 5 is a similar view, on the same plane and looking rearwardly.

The main frame 1 may be of the form here shown or of any suitable construction and is provided at its front end with a bolster 2 and a front axle 3, the said axle having front wheels 4 and being provided with a suitable tongue 5. A seat 6, for the driver, is mounted at the front end of the machine. The frame is provided near its rear end with bearings 7 for the rear axle shaft 8 which is provided with ground wheels 9 and is also provided with a sprocket wheel 10. Standard frames 11 are arranged on the sides of the main frame at a suitable distance from the front end thereof and are provided with guides 12 for the vertical arms 13 of a frame 14 which carries the beet digging plow 15. The frame 14 is horizontal and is at the lower ends of the arms 13. The plow 15 comprises a forwardly and downwardly inclined plate 16 which is substantially triangular in form and has a centrally arranged point 17. At the sides and rear of said plate are inclined and rearwardly converging wings 18 which are arranged in the angle between the frame 14 and the vertical arms 13 and have their upper ends secured to blocks 19 on the inner sides of said arms. The said wings converge upwardly.

The plow with its frame is movable vertically. The vertical arms 13 are provided on their front and rear sides with rack teeth 20 which are engaged by pinions 21 on shafts 22 which have their bearings in the standard frames. One of said shafts 22 also has a worm wheel 23 at one end and the said worm wheel is engaged by a worm 24 on a shaft 25, the said shaft being mounted in bearings in one of said standard frames, being provided at its rear end with a crank wheel 26 whereby it may be manually rotated, the said shaft being further provided with a ratchet wheel 27 which is engaged by a pawl 28, said pawl and ratchet wheel preventing casual rotation of the shaft. It will be understood that by appropriately turning the shaft 25 the worm and worm wheel will rotate the shafts 22 and hence also the pinions 21 and cause said pinions by coaction with the rack teeth of the arms 13 to raise or lower the plow as may be desired.

The machine when in operation is driven astride a beet row so that the plow runs under and uproots the beets and the beets are swept rearwardly over the plate 16 and are guided between the wings 18 and dropped behind the plow. To carry the beets as they are discharged from the plow to a beet topping mechanism I provide an endless carrier 29 which comprises a pair of endless sprocket chains 30 and pairs of cross rods 31 which connect said sprocket chains and which also form the pivots between some of the sprocket chain links. Carrier plates 32 are arranged on the outer sides of and connect the rods 31 of each pair of rods each carrier plate being bifurcated at its front end as at 33 and also bifurcated at its rear end as at 34. The carrier plates are provided at their centers with outwardly extending spaced carrier arms 35 between which the beets are caught as the carrier plates move upwardly, on the front lead of the carrier, in rear of the plow and the said arms hence arrange the beet tops uppermost on the carrier plates and with their tops opposite the slits or recesses 33 formed by the bifurcated upper ends of the carrier plates. A pair of standards 36 are mounted on the frame 1 at a suitable distance from the rear end thereof and have bearings for a shaft 37 which is provided with a pair of sprocket wheels 38. The chains of the beet carrier pass over the sprocket wheels 38, said chains also pass under a pair of sprocket wheels 39 on a shaft 40 which has its bearings 41 on the plow frame 14. To keep the carrier under the requisite tension and compensate for the vertical adjustments of the plow I provide tightening rollers 42 which are secured on a shaft 43 and bear on the front leads of the chains 30, said shaft being mounted in bearings in a pair of arms 44 which are pivotally mounted as at 45, between the arms 13 of the plow frame. The shaft 37 also has a spur gear 46 which is engaged by a similar gear 47 on a stub shaft 48. Said stub shaft also has a sprocket wheel 49 which is connected by an endless sprocket chain 50 with the sprocket wheel 10 on the rear axle shaft 8. Hence when the machine is in operation the carrier 29 is driven so that its front lead moves upwardly and rearwardly from the plow, as will be understood and hence the beets are correspondingly carried upwardly and rearwardly from the plow.

I will now describe the automatically operating mechanism which forms a part of my beet harvesting machine and serves to cut off the tops of the beets. The frame 1 is provided with a pair of standards 51 which are arranged a suitable distance in rear of the standards 36. A shaft 52 has its bearings in the standards 51 and is provided at one end with a sprocket wheel 53 which is connected by an endless sprocket chain 54 with a similar wheel 55 on the shaft 37. A series of rocker frames 56 have their lower ends pivotally mounted on the shaft 52. In the form of the invention here shown the carrier plates 32 are arranged on the rods 31, and three of the rocker frames 56 are provided so that said rocker frames are arranged in longitudinal alinement with the carrier plates. Each rocker frame has its sides connected, near its upper end, by the shaft 57 which is mounted in bearings in the sides of the rocker frame. The shaft 57 has a sprocket wheel 58 and also has an arm 59 which is provided at one end with a cutter 60. The shaft 52 which forms the pivot for the rocker frames is provided with sprocket wheels 61, one of which is provided for each rocker frame and the said sprocket wheels are connected to the sprocket wheels 58 of the cutter shafts by means of endless sprocket chains 62.

Each rocker frame is provided at its upper end with a pair of spaced forwardly extending beet holder arms 63 which are undercut at their front ends at 64 to conform approximately to the shape of the beets. The holder arms are pivotally mounted on the shaft 57 and each holder arm has a downwardly extending angle arm 65. Tensioning springs 66 are attached to the lower ends of said angle arms and have their lower ends connected to the sides of the rocker frames, said tensioning springs and angle arms serving to normally hold the beet holder arms with the front ends of the latter immediately above the upper side of the carrier, over the wheels 38 to yieldingly hold said beet holder arms so that the latter automatically adjust themselves to the beets presented thereto by the beet carrier plates and hence the beet holder arms accommodate themselves to beets of various sizes. As the beets have their tops thrust by the carrier plates rearwardly between the front ends of the beet holder arms the revolving cutters 60 cut off the beet tops as will be understood and throw them into the beet top pit 67, which is a suitable receiving receptacle on the rear end of the frame 1, the beets dropping from the carrier plates as the latter pass to the rear of the wheels 38 and falling into a pit or receptacle 68. The rocker frames 56 are yieldably supported in an upright position by springs 69, link rods 70 and yokes 71, said yokes being attached to the rocker frames, said link rods being attached to a cross bar 72 between a pair of standards 73 and also passing through openings in the yokes, the springs 69 bearing between said cross bar and the rear sides of said yokes. When a large beet is caught between the holder arms of one of the rocker frames, the movement of the beet with the carrier as the chains pass over the wheels 38 and while the beet is being topped, will tilt the rocker frame rearwardly on its pivoting shaft 52, against the tension of the springs 69 and after the beet has been topped and carried downwardly from the holder arms said spring will then return said rocker frame to its initial position, as will be understood.

Having thus described my invention I claim;—

1. In a beet harvesting machine a main frame, a plow, an upwardly and rearwardly inclined endless flexible carrier arranged with its lower portion in rear of the plow, a frame movable toward and from and arranged in rear of the upper portion of said carrier, beet holding arms extending forwardly from said frame and a cutter mounted in said frame for cutting the beet tops.

2. In a beet harvesting machine a plow, an upwardly and rearwardly inclined endless carrier arranged with its lower portion in rear of the plow, a rocking frame arranged in rear of the upper portion of the endless carrier, a power shaft on which said rocking frame is mounted, a shaft mounted for rotation in the upper portion in the rocking frame and provided with a revoluble cutter, connections between the power shaft and the cutter shaft to drive the latter from the former, a cushioning spring to move the rocking frame forwardly and a pair of yieldably mounted beet holding arms carried by and extending forwardly from the rocking frame and arranged in spaced relation and with the revoluble cutter between them.

3. In a beet harvesting machine a plow, an upwardly and rearwardly inclined endless carrier arranged with its lower portion in rear of the plow, a rocking frame arranged in rear of the upper portion of the endless carrier, a power shaft on which said rocking frame is mounted, a shaft mounted for rotation in the upper portion in the rocking frame and provided with a revoluble cutter, connections between the power shaft and the cutter shaft to drive the latter from the former, a cushioning spring to move the rocking frame forwardly and a pair of yieldably mounted beet holding arms carried by and extending forwardly from the rocking frame and arranged in spaced relation and with the revoluble cutter between them, said beet holding arms being pivotally mounted on the cutter shaft and being provided with angle arms, and springs connected to said angle arms and also to said rocking frame.

In testimony whereof I affix my signature in presence of two witnesses.

EDWIN HUNDEN.

Witnesses:
J. J. FITZGERALD,
WALTER HUNDEN.

Copies of this patent may be obtained for five cents each, by addressing the "Commissioner of Patents, Washington, D. C."